(12) United States Patent
Akiba

(10) Patent No.: US 11,739,966 B2
(45) Date of Patent: Aug. 29, 2023

(54) AIR-CONDITIONING SYSTEM AND AIR-CONDITIONING MANAGEMENT SYSTEM

(71) Applicant: Mitsubishi Electric Corporation, Tokyo (JP)

(72) Inventor: Kazuki Akiba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 352 days.

(21) Appl. No.: 17/274,499

(22) PCT Filed: Nov. 1, 2018

(86) PCT No.: PCT/JP2018/040689
§ 371 (c)(1),
(2) Date: Mar. 9, 2021

(87) PCT Pub. No.: WO2020/090081
PCT Pub. Date: May 7, 2020

(65) Prior Publication Data
US 2022/0049872 A1 Feb. 17, 2022

(51) Int. Cl.
*F24F 11/58* (2018.01)
*G08C 17/02* (2006.01)
*H04L 12/28* (2006.01)
*F24F 11/32* (2018.01)
*F24F 11/88* (2018.01)

(52) U.S. Cl.
CPC ............. *F24F 11/58* (2018.01); *F24F 11/32* (2018.01); *F24F 11/88* (2018.01); *G08C 17/02* (2013.01); *H04L 12/2823* (2013.01)

(58) Field of Classification Search
CPC .. F24F 11/58; F24F 11/32; F24F 11/88; F24F 11/56; F24F 11/63; G08C 17/02; G08C 2201/93; H04L 12/2823; H04L 12/2856
See application file for complete search history.

(56) References Cited

U.S. PATENT DOCUMENTS 5,299,432 A * 4/1994 Nakae ..................... F24F 11/79
62/298
8,515,585 B2 * 8/2013 Uraki ................. H05K 7/20836
236/49.3

(Continued)

FOREIGN PATENT DOCUMENTS

JP 2005195307 A 7/2005
JP 2008144973 A 6/2008

(Continued)

OTHER PUBLICATIONS

International Search Report of the International Searching Authority dated Dec. 11, 2018 for the corresponding international application No. PCT/JP2018/040689 (and English translation).

*Primary Examiner* — Adnan Aziz
(74) *Attorney, Agent, or Firm* — Posz Law Group, PLC

(57) ABSTRACT

Provided is an air-conditioning system including a plurality of communication devices including an outdoor unit that are interconnected. The outdoor unit has a control unit configured to save all communication data exchanged between the communication devices in a memory processor that can be accessed via a network.

9 Claims, 8 Drawing Sheets

(56) References Cited

U.S. PATENT DOCUMENTS

| | | | | |
|---|---|---|---|---|
| 2009/0139251 A1* | 6/2009 | Masui | ............... | F24F 11/64 |
| | | | | 62/129 |
| 2014/0330437 A1 | 11/2014 | Kuroiwa et al. | | |
| 2015/0078391 A1* | 3/2015 | Kubo | ............... | F24F 11/84 |
| | | | | 370/400 |
| 2018/0202681 A1* | 7/2018 | Kim | ............... | F24F 11/30 |
| 2021/0140669 A1* | 5/2021 | Wang | ............... | F24F 11/56 |
| 2021/0207829 A1* | 7/2021 | Mizuno | ............... | F24F 11/46 |

FOREIGN PATENT DOCUMENTS

| | | | |
|---|---|---|---|
| JP | 2011179706 A | 9/2011 | |
| JP | WO2016189974 A1 | 8/2017 | |
| WO | 2013114525 A1 | 8/2013 | |

\* cited by examiner

160

AIR-CONDITIONING SYSTEM AND AIR-CONDITIONING MANAGEMENT SYSTEM

CROSS REFERENCE TO RELATED APPLICATION

This application is a U.S. national stage application of International Patent Application No. PCT/JP2018/040689 filed on Nov. 1, 2018, the contents of which are incorporated herein by reference.

TECHNICAL FIELD

The present disclosure relates to an air-conditioning system including an indoor unit and an indoor unit, and an air-conditioning management system.

BACKGROUND ART

Hitherto, an air-conditioning system configured by being connected to a plurality of communication devices including an indoor unit and an outdoor unit has been proposed (for example, see Patent Literature 1). In the air-conditioning system of Patent Literature 1, communication data is exchanged between communication devices based on an address set for each of the communication devices. That is, the communication data exchanged between the communication devices in the air-conditioning system described above is read and then discarded by a communication device that is not specified as a transmission destination address.

CITATION LIST

Patent Literature

Patent Literature 1: Japanese Patent Application No. 2017-520282

SUMMARY OF INVENTION

Technical Problem

However, when it is desired to check for an abnormality by analyzing a state of the air-conditioning system or other information, it is necessary to obtain all communication data in the air-conditioning system. Therefore, in such a case, in the air-conditioning system as described in Patent Literature 1, it is necessary to use external measurement equipment and measurement application and obtain all communication data exchanged between the communication devices. For this reason, when an operation check or other checks is performed on the air-conditioning system is performed, preparation or other arrangement requires labor, which impairs rapidness.

The present disclosure has been made to solve the above-described problem, and is aimed at providing an air-conditioning system in which labor taken for performing the operation check or other checks on the air-conditioning system is reduced, and enabling investigations on states of the communication devices to be conducted faster than ever, and providing an air-conditioning management system.

Solution to Problem

An air-conditioning system according to one embodiment of the present disclosure is an air-conditioning system including a plurality of communication devices including an outdoor unit that are interconnected, the outdoor unit having a control unit including a data-obtaining processing device configured to save all communication data exchanged between the communication devices in a storage processing device that can be accessed via a network.

An air-conditioning management system according to one embodiment of the present disclosure has the air-conditioning system described above and a storage processing device configured to save all communication data exchanged between the communication devices.

Advantageous Effects of Invention

According to one embodiment of the present disclosure, since all the communication data exchanged between the communication devices is saved in the storage processing device, it is unnecessary to use external measurement equipment and measurement application, and labor taken for performing an operation check or other checks on the air-conditioning system can be reduced, so that investigations on states of the communication devices can be conducted faster than ever.

DESCRIPTION OF EMBODIMENTS

Embodiment 1

Figure 1:
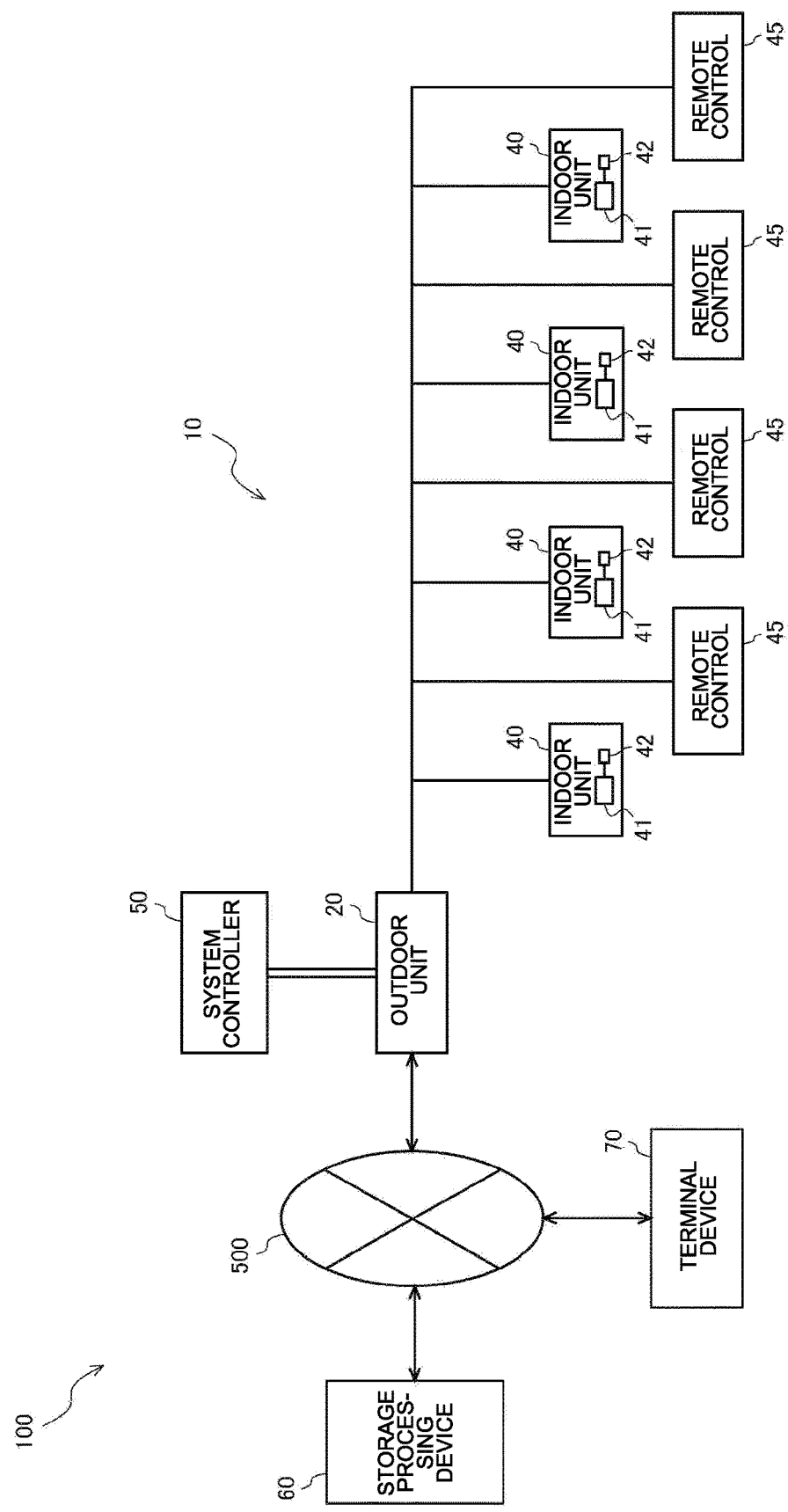
FIG. 1 is an overall configuration diagram of an air-conditioning management system according to Embodiment 1 of the present disclosure.
Figure 2:
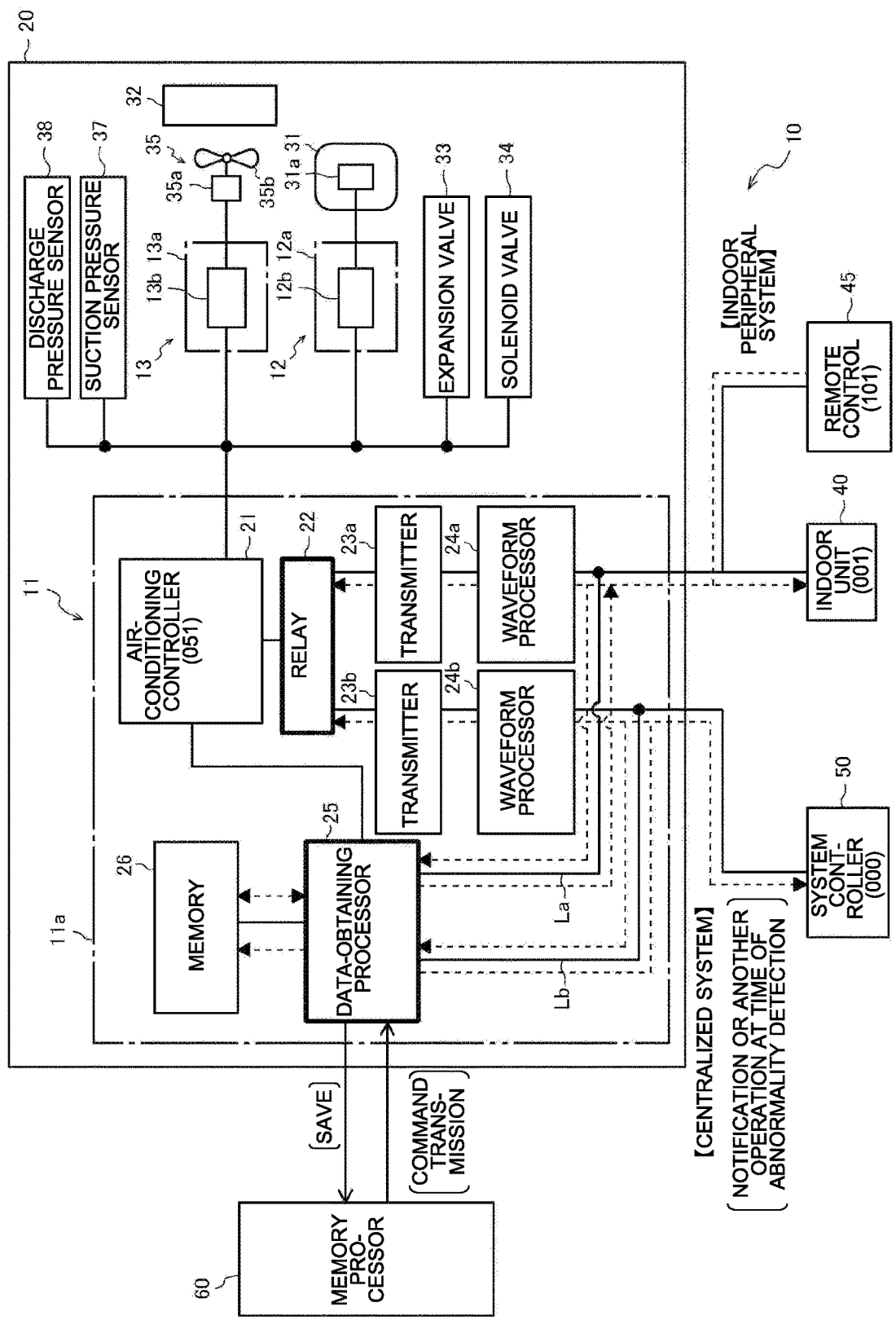
FIG. 2 is a schematic configuration diagram related to acquirement of communication data between communication devices of an air-conditioning system of FIG. 1.
Figure 3:
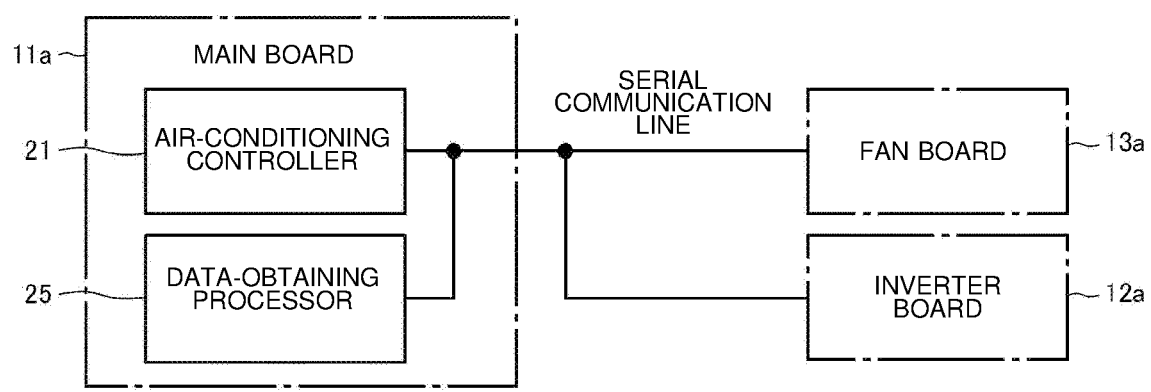
FIG. 3 is a schematic configuration diagram related to acquirement of communication data in a serial communication in an outdoor unit of FIG. 2.

FIG. 1 is an overall configuration diagram of an air-conditioning management system according to Embodiment 1 of the present disclosure. FIG. 2 is a schematic configuration diagram related to acquirement of communication data between communication devices of an air-conditioning system of FIG. 1. FIG. 3 is a schematic configuration diagram related to acquirement of communication data in a serial communication in an outdoor unit of FIG. 2. A configuration of an air-conditioning management system 100 of the present Embodiment 1 will be described with reference to FIG. 1 to FIG. 3. It is noted that FIG. 2 illustrates one indoor unit 40 and one remote control 45.

As illustrated in FIG. 1, the air-conditioning management system 100 includes an air-conditioning system 10, a storage processing device 60, and a terminal device 70. The air-conditioning system 10 has, as a plurality of communication devices, one or more outdoor units 20, one or more indoor units 40, one or more remote controls 45, and a system controller 50. FIG. 1 exemplifies a case where the air-conditioning system 10 has one outdoor unit 20, four indoor units 40, and four remote controls 45. Hereinafter, a description will be made based on the configuration shown in FIG. 1.

The remote controls 45 installed on a site are arranged on a wall of a room or other locations, and have a function of remotely operating the indoor units 40. The system controller 50 manages the air-conditioning system 10 in an overall manner. The storage processing device 60 is, for example, a cloud server based on cloud computing, and has a function as a storage. The storage processing device 60 may also be a physical server such as a Web server.

The terminal device 70 is a personal computer (PC) installed in an agency or other companies where a designer of the air-conditioning system 10, a service person, or other staffs are present. A desktop PC, a laptop PC, and a communication terminal such as a smart phone are supposed as the terminal device 70. The outdoor unit 20, the storage processing device 60, and the terminal device 70 are connected via a network 500 such as the Internet and can communicate with one another. That is, the storage processing device 60 can be accessed via the network 500.

The outdoor unit 20 is installed, for example, in an outdoor space, and as illustrated in FIG. 2, has a control unit 11, a compressor drive unit 12, and a fan drive unit 13. In addition, the outdoor unit 20 has a compressor 31, an outdoor heat exchanger 32, an expansion valve 33, a solenoid valve 34, and a fan 35. Furthermore, a suction pressure sensor 37 and a discharge pressure sensor 38 are disposed in the outdoor unit 20.

The compressor 31 has a compressor motor 31a driven by an inverter circuit 12b, and suctions and compresses refrigerant. The outdoor heat exchanger 32 is, for example, a fin and tube type heat exchanger, and causes heat exchange to be performed between the refrigerant flowing in a refrigerant circuit and outside air. The expansion valve 33 is, for example, an electronic expansion valve, and decompresses and expands the refrigerant. The solenoid valve 34 allows or cuts off passage of the refrigerant. The fan 35 has a fan motor 35a driven by a fan drive circuit 13b, and an impeller 35b configured to rotate by using the fan motor 35a as a power source and send wind to the outdoor heat exchanger 32.

The compressor drive unit 12 is obtained by mounting the inverter circuit 12b for driving the compressor 31 and other parts on an inverter board 12a. The fan drive unit 13 is obtained by mounting the fan drive circuit 13b for driving the fan 35 and other parts on a fan board 13a.

The suction pressure sensor 37 is disposed on a suction side of the compressor 31, and configured to measure a pressure of the refrigerant suctioned into the compressor 31. The discharge pressure sensor 38 is disposed on a discharge side of the compressor 31, and configured to measure a pressure of the refrigerant discharged from the compressor 31. The outdoor unit 20 may also have a refrigerant temperature sensor which is, for example, a thermistor, and is configured to measure a temperature of the refrigerant.

The control unit 11 has, for example, a main board 11a contained in a control box of the outdoor unit 20. A processor, a memory, and other components are mounted on the main board 11a. In further detail, the control unit 11 has an air-conditioning controller 21, a relay 22, a transmitter 23a, a transmitter 23b, a waveform processor 24a, a waveform processor 24b, a data-obtaining processor 25, and a memory 26, and these devices are mounted on the main board 11a. A detail will be described below.

The indoor units 40 are installed, for example, in an indoor space, and configured to adjust an air environment of an allocated air-conditioned space. Herein, each of the plurality of indoor units 40 may be arranged in a separate room or other spaces, and two or more of the indoor units 40 may also be arranged in a same room or other spaces. Each of the indoor units 40 has an indoor control device 41 configured to control an internal actuator. The indoor control device 41 is configured to read communication data from the outdoor unit 20, the remote control 45, and the system controller 50, and uses read communication data to control the indoor unit 40.

In addition, an indoor temperature sensor 42 which is a thermistor and configured to measure a temperature of the air-conditioned space is disposed in each of the indoor units 40, for example. The indoor temperature sensor 42 is disposed, for example, in an air inlet of the indoor unit 40. The indoor control device 41 has a function of outputting information on a temperature measured by the indoor temperature sensor 42 to the communication device such as the outdoor unit 20. Then, the indoor unit 40 has an indoor heat exchanger (not illustrated) which is a fin and tube type heat exchanger, for example.

In other words, the air-conditioning system 10 of the present Embodiment 1 has a refrigerant circuit in which the compressor 31, the outdoor heat exchanger 32, the expansion valve 33, and the solenoid valve 34 of the outdoor unit 20 are connected to the indoor heat exchanger of each of the indoor units 40 by refrigerant pipes, and the refrigerant circulates. A decompression device formed by an electronic expansion valve or other parts may also be disposed in each of the indoor units 40, for example. In addition, the air-conditioning system 10 may be an air-conditioning system that can carry out both a cooling operation and a heating operation. In this case, a four way valve that switches flow passages of the refrigerant and other parts are disposed in the outdoor unit 20.

Hereinafter, a communication path between the outdoor unit 20 and the indoor unit 40 and a communication path between the outdoor unit 20 and the remote control 45 are referred to as an "indoor-outdoor communication system". In addition, a communication path where the outdoor unit 20 and the system controller 50 are wired and a communication path where the mutual outdoor units 20 are wired are referred to as a "centralized system". It is noted that in FIG. 2, "051" is exemplified as an address of the air-conditioning control device 21, "001" is exemplified as an address of the indoor unit 40, "101" is exemplified as an address of the remote control 45, and "000" is exemplified as an address of the system controller 50.

The air-conditioning controller 21 can include an arithmetic device such as a microcomputer, and software that operates in collaboration with the arithmetic device described above and realizes an air-conditioning function such as refrigerant control. The air-conditioning control device 21 is configured to control the outdoor unit 20. That is, the air-conditioning control device 21 operates in collaboration with the indoor control device 41, and controls various actuators of the outdoor unit 20. According to the present Embodiment 1, the air-conditioning controller 21 is configured to control operations of the compressor 31, the expansion valve 33, the solenoid valve 34, and the fan 35.

The relay 22 is configured, for example, by a microprocessor. In a communication between communication devices, the relay 22 is configured to relay communication data of the centralized system and the indoor-outdoor communication system. In other words, the relay 22 is configured to relay communication data from the outside to the air-conditioning controller 21. Here, the arithmetic devices such as the microprocessor and the processor have a limitation on tasks that can be processed per clock cycle. For this reason, the relay 22 operates such that communication data other than the communication data destined to the air-conditioning controller 21 among the communication data transmitted from the outside is read and discarded, and information that is not necessary for the air-conditioning controller 21 operating in charge of the refrigerant control or other control is not obtained. That is, the relay 22 functions as a bridge and designed such that when a transmission destination address of the communication data is an address other than the address of the air-conditioning controller 21, the relay 22 does not receive but read and discard the communication data.

Each of the transmitter 23a and the transmitter 23b is configured, for example, by an application specific integrated circuit (ASIC), and executes signal processing between communication devices. The signal processing performed by the transmitter 23a and the transmitter 23b includes processing for generating communication data transmitted to the outside, processing for transferring received communication data to the relay 22, and other processing. The transmitter 23a is connected between the relay 22 and the waveform processor 24a in the indoor-outdoor communication system, and performs signal processing of communication data that flows through the indoor-outdoor communication system. The transmitter 23b is connected between the relay 22 and the waveform processor 24b in the centralized system, and performs signal processing of communication data that flows through the centralized system.

Each of the waveform processor 24a and the waveform processor 24b is configured, for example, by an integrated circuit (IC). The waveform processor 24a applies waveform processing and other processing to communication data output by the transmitter 23a. The waveform processor 24b applies waveform processing and other processing to communication data output by the transmitter 23b.

The data-obtaining processor 25 can be an arithmetic device such as a microprocessor, and software that operates in collaboration with the arithmetic device described above and realizes the following functions. The data-obtaining processor 25 saves all the communication data exchanged between the communication devices in the memory processor 60 disposed in the outside. That is, the data-obtaining processor 25 accumulates obtained communication data in the storage processor 60 over time.

The data-obtaining processor 25 of the present Embodiment 1 is connected to a communication line between the outdoor unit 20 and other communication devices, and obtains all the communication data exchanged between the communication devices. In other words, the data-obtaining processor 25 is connected to the indoor-outdoor communication system and the centralized system, and obtains all the communication data flowing on the communication line between the communication devices that form the air-conditioning system 10. The communication data obtained by the data-obtaining processor 25 is used when the operation check or other checks are performed on the air-conditioning system 10.

As also illustrated in FIG. 3, for example, the data-obtaining processor 25 obtains all communication data in a serial communication between boards such as a serial communication between the main board 11a and the fan board 13a or between the main board 11a and the inverter board 12a. The data-obtaining processor 25 is configured not to recognize its own address without obtaining information on its own address from the air-conditioning controller 21. Therefore, the data-obtaining processor 25 can obtain all the communication data without reading and discarding the communication data irrespective of an address setting of the air-conditioning system 10.

In further detail, an indoor-outdoor communication system wiring La extending from the data-obtaining processor 25 is connected to an outer side than the waveform processor 24a, that is, an indoor unit 40 side of the waveform processor 24a in the indoor-outdoor communication system. A centralized system wiring Lb extending from the data-obtaining processor 25 is connected to an outer side than the waveform processor 24b, that is, a system controller 50 side of the waveform processor 24b in the centralized system. In this manner, since the data-obtaining processor 25 is arranged on the outer side relative to the waveform processor 24a and the waveform processor 24b, it is possible to obtain all the communication data flowing through the indoor-outdoor communication system and the centralized system. It is noted that a frame of communication data transmitted from the outdoor unit 20 is created by the transmitter 23a and the waveform processor 24a, and the transmitter 23b and the waveform processor 24b. For this reason, when the data-obtaining processor 25 is connected to an inner side than these devices, the data-obtaining processor 25 does not correctly obtain the communication data transmitted from the outdoor unit.

The data-obtaining processor 25 temporarily stores the obtained communication data in the memory 26. In other words, the memory 26 is a memory that stores the communication data obtained by the data-obtaining processor 25. The data-obtaining processor 25 uses the communication data temporarily stored in the memory 26 to determine whether or not an abnormality occurs in components of the communication devices, in other words, whether or not the components of the communication devices operate as designed. The data-obtaining processor 25 of the present Embodiment 1 can detect a failure or an early sign of a failure of the components of the communication devices from the obtained communication data.

For example, the data-obtaining processor 25 can be provided with a function of determining whether or not each of the sensors such as the suction pressure sensor 37, the discharge pressure sensor 38, and the indoor temperature sensor 42 indicates a value in a valid range. In this case, information on the valid range for each of the sensors is set in the data-obtaining processor 25 in advance. When a measured value of a certain sensor is out of the valid range, the data-obtaining processor 25 determines that an abnormality occurs in this sensor. The data-obtaining processor 25 may also decide a degree of the abnormality of the sensor according to a difference between an upper limit value or a lower limit value of the valid range and the measured value. When the setting is made as described above, it is also possible to accurately detect the failure of the sensor.

In addition, the data-obtaining processor 25 can be provided with a function of determining, for example, whether or not the solenoid valve 34 is opened and closed as instructed, and whether or not the expansion valve 33 is opened at an opening degree as instructed. Additionally, the data-obtaining processor 25 can be provided with a function of determining whether or not a response to a request is a correct value in the communication between the communication devices. For example, when an instruction for setting a night mode for suppressing noise from the fan 35 is received from the system controller 50 or other controllers, the data-obtaining processor 25 determines whether or not a rotational frequency of the fan motor 35*a* is lower than a normal rotational frequency according to this setting instruction. Here, items of abnormality determination with regard to the components of the communication devices are not limited to the three examples described above, and various items can be adopted.

When a component that does not operate as designed exists as a result of the abnormality determination described above, the data-obtaining processor 25 transmits abnormality data indicating that the abnormality occurs in the air-conditioning system 10 to the outside. According to the present Embodiment 1, the data-obtaining processor 25 transmits the abnormality data to at least one of the remote control 45, the system controller 50, and the terminal device 70. Since the component in which the abnormality occurs is identified by the item of the abnormality determination, the data-obtaining processor 25 may also make the abnormality data include identification information serving as information on the component in which the abnormality occurs and transmit the abnormality data.

When the data-obtaining processor 25 transmits the abnormality data to the remote control 45, the remote control 45 announces information indicating that the abnormality occurs in the air-conditioning system 10. With this configuration, a user present in a room where the remote control 45 is arranged can recognize that the abnormality occurs in the air-conditioning system 10, and it is possible to urge the administrator to take measures such as making a contact to a service person or other staffs. Here, it is assumed that a technique of announcement by the remote control 45 includes, in addition to display of characters or an image, announcement by way of sound, for example. When the abnormality data includes the identification information, the remote control 45 may also announce the information on the component in which the abnormality occurs by way of characters, sound, or other methods.

When the data-obtaining processor 25 transmits the abnormality data to the system controller 50, the system controller 50 announces the information indicating that the abnormality occurs in the air-conditioning system 10. With this configuration, an administrator or other staffs who manage the air-conditioning system 10 can realize that the abnormality occurs in the air-conditioning system 10 by the system controller 50, and it is possible to urge the administrator to take the measures such as making a contact to the service person or other staffs. A technique of announcement by the system controller 50 is similar to that by the remote control 45, and when the abnormality data includes the identification information, the system controller 50 may also announce the information on the component in which the abnormality occurs by way of characters, sound, or other method.

When the data-obtaining processor 25 transmits the abnormality data to the terminal device 70 through the network 500, the service person or other staffs can be promptly notified of the abnormality of the air-conditioning system 10. For this reason, early measures are taken to avoid a failure or another problem, so that an influence on another component can be minimized. A technique of announcement by the terminal device 70 is similar to that of the remote control 45. When the abnormality data includes the identification information, the terminal device 70 may also announce the information on the component in which the abnormality occurs by way of characters, sound, or other methods.

In addition, the data-obtaining processor 25 saves all the obtained communication data in a storage area of the storage processor 60 disposed outside the outdoor unit 20. In further detail, after the determination on the abnormality described above is performed, the data-obtaining processor 25 saves the communication data used for the determination in the storage processor 60 via the network 500. Therefore, the service person or another staff who is informed due to the announcement by the data-obtaining processor 25 that the abnormality occurs in the air-conditioning system 10 can check the communication data saved in the storage processor 60 via the network 500 without site visit and take appropriate measures. At this time, since the storage processor 60 also stores communication data at a normal time, the service person or other staffs can find out states of change over time of the components, and therefore understand a tendency of the abnormality and select further appropriate measures.

Furthermore, the data-obtaining processor 25 has a function of obtaining information according to a data transmission request from the terminal device 70, and returning the obtained information to the terminal device 70. That is, when the service person or other staff desires to check data other than the communication data obtained from the storage processor 60, the service person or other staffs can request transmission of the data to the data-obtaining processor 25 through the network 500 by operating the terminal device 70. The data-obtaining processor 25 obtains communication data, sensing data, or other data in response to the data transmission request from the terminal device 70, and after the obtained data is stored in the memory 26, transmits this data to the terminal device 70. Here, the data-obtaining processor 25 may also store the data obtained in response to the request from the terminal device 70 in the storage processor 60, and transmit a signal indicating that the data is stored in the storage processor 60 to the terminal device 70.

The data transmission request from the terminal device 70 may also be transmitted to the data-obtaining processor 25 via the storage processor 60. That is, the storage processor 60 may also provide intermediation of a data communication between the terminal device 70 and the data-obtaining processor 25, and a command may also be transmitted from the storage processor 60 to the data-obtaining processor 25. When sensing data is obtained, the data-obtaining processor 25 transmits a signal for requesting data to the air-conditioning controller 21, each of the indoor units 40, each of the remote controls 45, the system controller 50, and other components through the communication lines of the indoor-outdoor communication system and the centralized system.

Here, the control unit 11 may also have a single waveform processor having both a function of the waveform processor 24*a* and a function of the waveform processor 24*b*. That is, the control unit 11 has the air-conditioning controller 21 configured to control the outdoor unit 20, the relay 22 configured to relay the communication data from the outside to the air-conditioning controller 21, and one or two waveform processors configured to apply waveform processing to the communication data relayed by the relay 22. Then, a wiring extending from the data-obtaining processor 25 is connected to a communication line inside the outdoor unit 20 on an outer side than the waveform processor, in other words, a communication line extending from the waveform processor on a side opposite to the relay 22.

Figure 4:
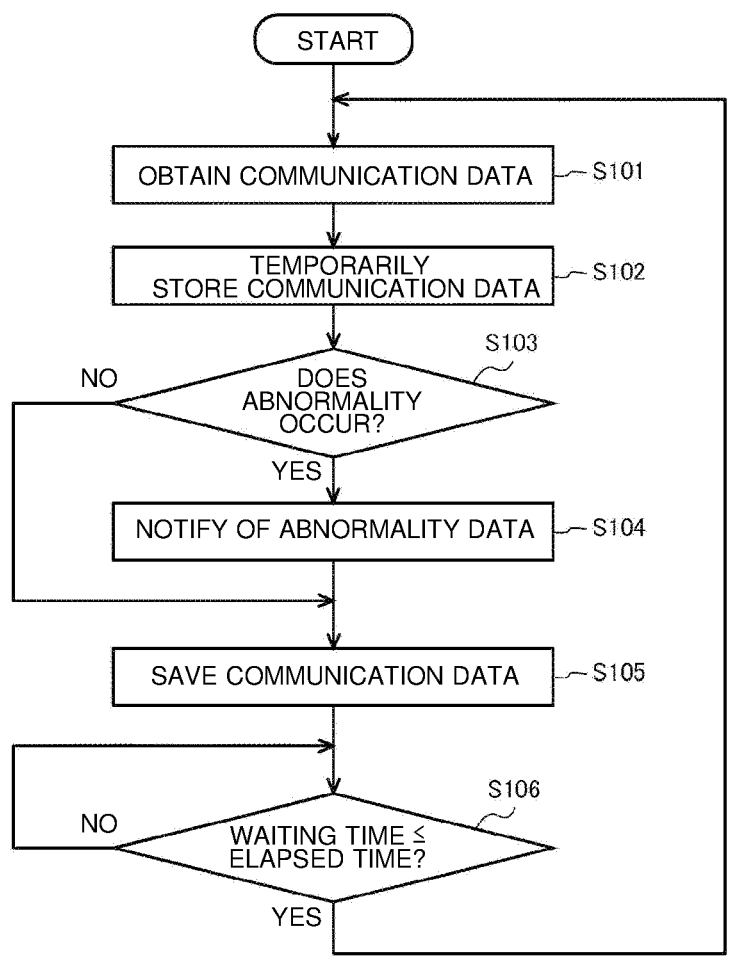
FIG. 4 is a flowchart exemplifying an outline of an operation of the air-conditioning management system of FIG. 1.

FIG. 4 is a flowchart exemplifying an outline of an operation of the air-conditioning management system of FIG. 1. With reference to FIG. 4, a method of the abnormality determination of the air-conditioning system 10 by the control unit 11 of the present Embodiment 1 will be described.

The data-obtaining processor 25 obtains all the communication data exchanged between the communication devices (step S101). Then, the data-obtaining processor 25 temporarily stores the obtained communication data in the memory 26 (step S102). Subsequently, the data-obtaining processor 25 uses the communication data temporarily stored in the memory 26 to determine whether or not an abnormality occurs in the air-conditioning system 10, in other words, whether or not an abnormality occurs in the components of the communication devices (step S103).

When it is determined that the abnormality occurs in the air-conditioning system 10 (step S103/Yes), the data-obtaining processor 25 transmits the abnormality data indicating that the abnormality occurs in the air-conditioning system 10 to the outside (step S104). Then, the data-obtaining processor 25 saves the communication data used for the determination in the storage processor 60 via the network 500 (step S105). In addition, when it is also determined that the abnormality does not occur in the air-conditioning system 10 (step S103/No), the data-obtaining processor 25 saves the communication data used for the determination in the storage processor 60 as communication data at a normal time (step S105).

Then, the data-obtaining processor 25 waits until an elapsed time since a series of processing in steps S101 to S105 is started completes a waiting time (step S106), the elapsed time reaches the waiting time, the process proceeds to processing in step S101. That is, the data-obtaining processor 25 executes a series of processing in steps S101 to S106 each time the elapsed time completes the waiting time. The waiting time is set in advance, and can be appropriately changed.

As described above, the air-conditioning system 10 of the present embodiment 1 saves all the communication data exchanged between the communication devices in the storage processor 60. Thus, since it is unnecessary to use the external measurement equipment and the measurement application, the labor taken for performing the operation check or other checks on the air-conditioning system 10 can be reduced, and the rapidness of the investigations on states of the communication devices can be improved. That is, when the operation check or other checks are performed on the air-conditioning system 10 installed on a site, the service person or other staffs can obtain all the communication data exchanged between the communication devices for the investigations on the states of the communication devices from the storage processor 60.

In addition, the data-obtaining processor 25 is connected to a communication line between the outdoor unit 20 and another communication device, and configured to obtain all the communication data exchanged between the communication devices. Therefore, the communication data can be highly accurately and promptly obtained without changing an internal configuration of the air-conditioning controller 21 or other components.

Furthermore, the data-obtaining processor 25 determines whether or not a failure occurs in the components of the communication devices or whether or not an early sign of a failure is present based on all the obtained communication data. Then, as a result of determination, when the component exists where the failure occurs or the early sign of the failure appears, the data-obtaining processor 25 transmits the abnormality data to the remote control 45 or other components. With this configuration, the data-obtaining processor 25 displays, for example, that an abnormality occurs in a specific component on a display screen of the remote control 45 or other components. In this manner, with the air-conditioning management system 100, the service person or other staffs can be promptly informed of the occurrence of the abnormality in the air-conditioning system 10. For this reason, when the data-obtaining processor 25 detects the early sign of the failure, for example, the service person or other staffs can implement measures such as part replacement before the air-conditioning system 10 halts due to the abnormality. That is, with the air-conditioning system 10 and the air-conditioning management system 100, it is possible to promptly deal with the occurrence of the abnormality.

In addition, in response to the data transmission request from the terminal device 70 in the outside, the data-obtaining processor 25 has a function of obtaining data according to this data transmission request, and returning the obtained data to the terminal device 70. Therefore, when the service person or other staffs desires to check data other than the communication data stored in the storage processor 60, it is possible to obtain any data via the network 500. Thus, since the service person or other staff can check data that is desired to be additionally checked without site visit, it is possible to further promptly deal with the occurrence of the abnormality.

Modified Example 1-1

The data-obtaining processor 25 of the present Embodiment 1 can obtain communication data flowing on the communication lines (hereinafter, also referred to as "transmission lines") of the indoor-outdoor communication system and the centralized system, but does not obtain information that does not flow on the transmission lines such as retransmission information. On the other hand, the relay 22 holds the information that does not flow on the transmission lines such as the retransmission information. Hereinafter, the information that does not flow on the transmission lines such as the retransmission information is also referred to as "non-transmission information". Then, the non-transmission information described above may be significant to abnormality determination by a data-obtaining processor 125 or data analysis by the service person or other staffs.

In view of the above, the relay 22 of the present Modified Example 1-1 has a function of storing the non-transmission information that is not obtained by the data-obtaining processor 25 in the memory 26. When the setting is made as described above, at the time of the abnormality determination, the data-obtaining processor 125 can obtain and use the non-transmission information from the memory 26. For this reason, the number of techniques of the abnormality determination can be increased, and the accuracy of the abnormality determination can be increased. In addition, the data-obtaining processor 125 can also obtain the non-transmission information from the memory 26 in response to the data transmission request from the terminal device 70, and return the obtained non-transmission information to the terminal device 70. Thus, the accuracy of the data analysis by the service person or other staffs can be improved.

Embodiment 2

Figure 5:
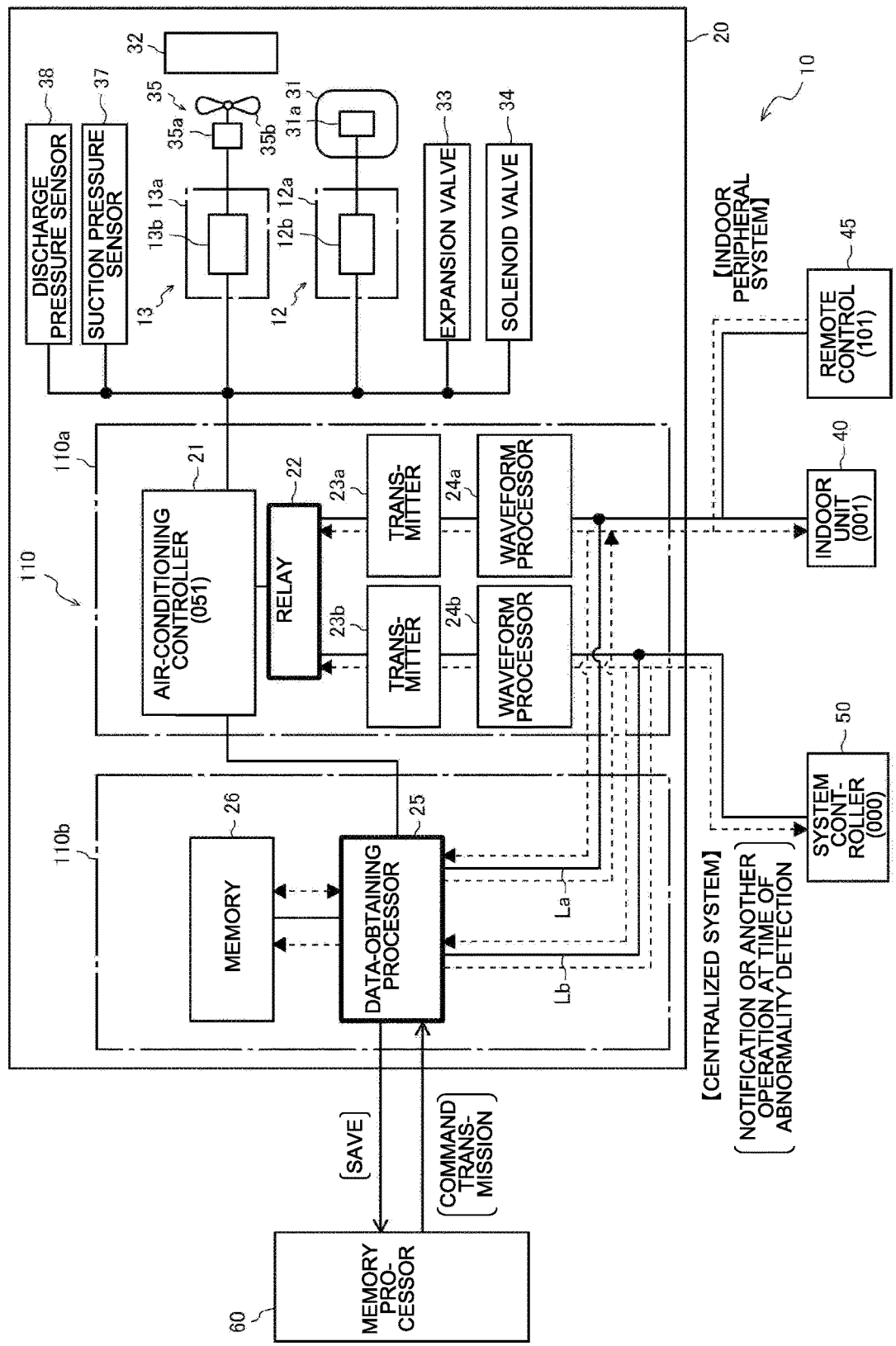
FIG. 5 is a schematic configuration diagram related to acquirement of communication data between communication devices of an air-conditioning system according to Embodiment 2 of the present disclosure.
Figure 6:
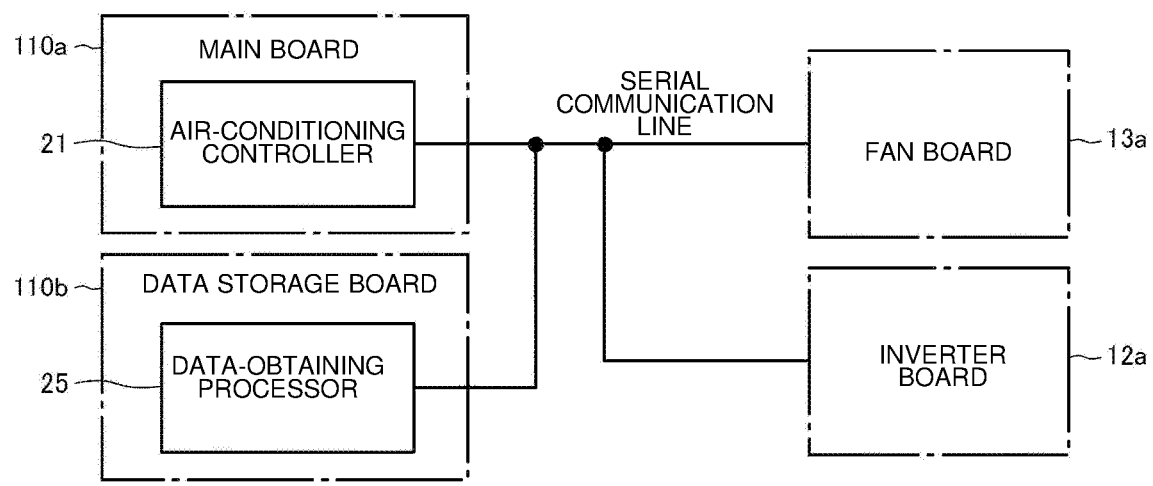
FIG. 6 is a schematic configuration diagram related to acquirement of communication data in a serial communication in an outdoor unit of FIG. 5.

FIG. 5 is a schematic configuration diagram related to acquirement of the communication data between the communication devices of the air-conditioning system according to Embodiment 2 of the present disclosure. FIG. 6 is a schematic configuration diagram related to acquirement of the communication data in the serial communication in the outdoor unit of FIG. 5.

An overall configuration of the air-conditioning management system according to the present Embodiment 2 is similar to that in the example of FIG. 1 of Embodiment 1. As illustrated in FIG. 5 and FIG. 6, a feature resides in that a control unit 110 of the present Embodiment 2 separately has a data storage board 110b in addition to a main board 110a. With regard to a component equivalent to that of Embodiment 1, a same reference sign is used, and a description thereof is omitted.

As illustrated in FIG. 5, in the control unit 110, the air-conditioning controller 21, the relay 22, the transmitter 23a, the transmitter 23b, the waveform processor 24a, and the waveform processor 24b are mounted on the main board 110a. In addition, in the control unit 110, the data-obtaining processor 25 and the memory 26 are mounted on the data storage board 110b.

According to the present Embodiment 2 too, the data-obtaining processor 25 obtains all the communication data flowing on the communication line between the communication devices that form the air-conditioning system 10, and stores the obtained communication data in the memory 26 and the memory processor 60. In addition, the data-obtaining processor 25 executes the abnormality determination by using the obtained communication data. That is, the control unit 110 operates similarly as in the control unit 11 of Embodiment 1.

As described above, with the air-conditioning system 10 of the present Embodiment 2 too, all the communication data exchanged between the communication devices can be saved in the memory processor 60. Therefore, since it is unnecessary to use the external measurement equipment and the measurement application, the labor when the check on the operation of the air-conditioning system 10 or other processing is performed can be reduced, and the rapidness of the investigations on the states of the communication devices can be improved.

In addition, the control unit 110 of the present Embodiment 2 has the main board 110a on which the air-conditioning controller 21 is mounted, and the data storage board 110b on which the data-obtaining processor 25 is mounted. That is, in the case of the air-conditioning system 10 of the present Embodiment 2, it is possible to select whether or not the data storage board 110b is to be disposed according to needs of a user, in other words, whether or not all the communication data exchanged between the communication devices is to be obtained. Then, even when a structure of the main board 110a is changed, the data storage board 110b can be mounted inside the control box of the outdoor unit 20 without changing a structure of the data storage board 110b. Therefore, the data-obtaining processor 25 mounted on the data storage board 110b can be used in association with the air-conditioning controller 21 provided with various functions. Other advantages and aspects are similar to those of Embodiment 1. It is noted that the configuration of Modified Example 1-1 can also be applied to the control unit 110 of the present Embodiment 1.

Embodiment 3

Figure 7:
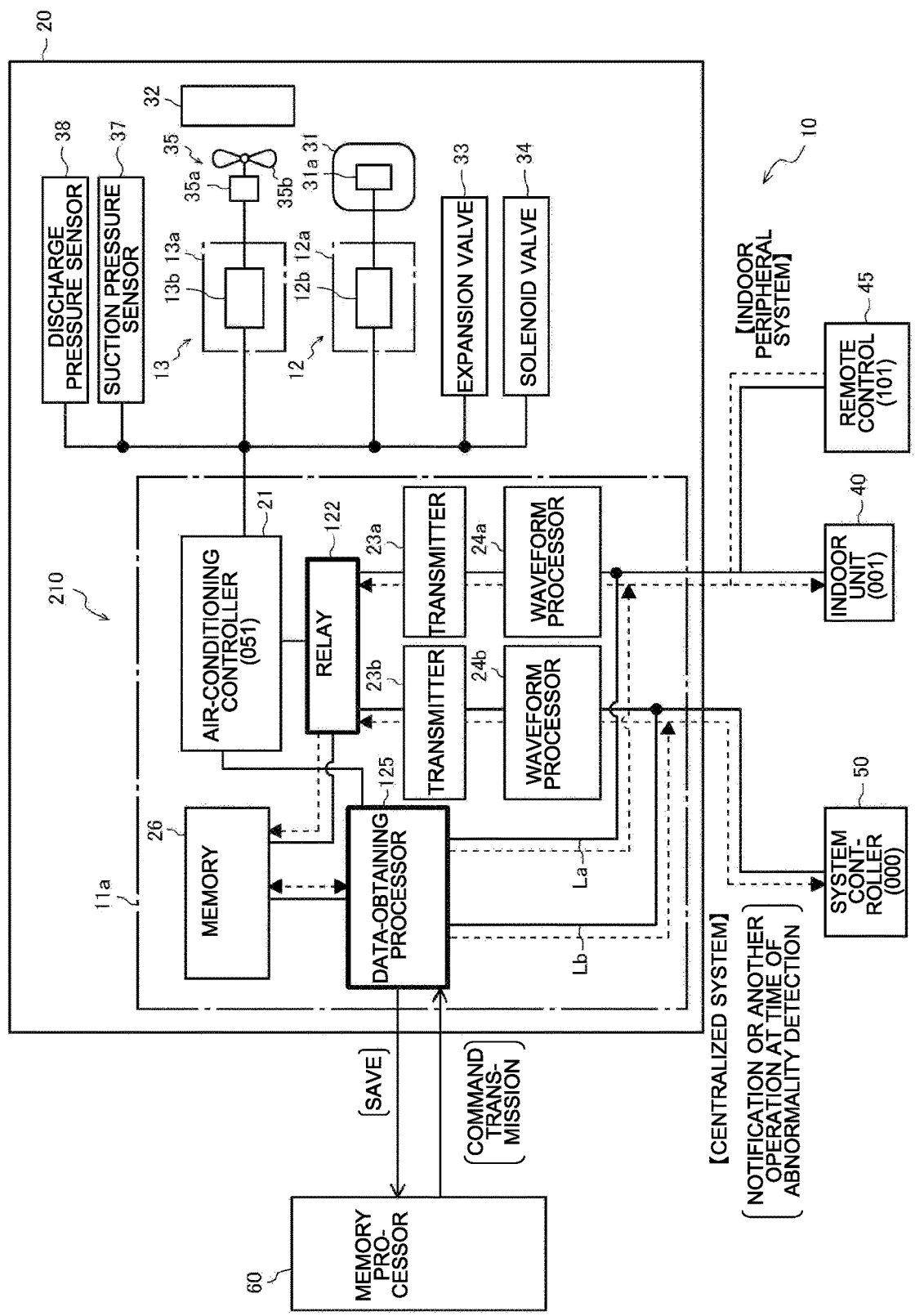
FIG. 7 is a schematic configuration diagram related to acquirement of communication data between communication devices of an air-conditioning system according to Embodiment 3 of the present disclosure.

FIG. 7 is a schematic configuration diagram related to acquirement of the communication data between the communication devices of the air-conditioning system according to Embodiment 3 of the present disclosure. An overall configuration of the air-conditioning management system according to the present Embodiment 3 is similar to that in the example of FIG. 1 of Embodiment 1. With regard to a component equivalent to that of Embodiments 1 and 2, a same reference sign is used, and a description thereof is omitted.

A control unit 210 of the present Embodiment 3 has a relay 122 provided with a function of obtaining all the communication data exchanged between the communication devices that constitute the air-conditioning system 10, and storing the obtained communication data in the memory 26. Other functions of the relay 122 are similar to those of the relay 22 of Embodiments 1 and 2. That is, the relay 122 relays the communication data from the outside to the air-conditioning controller 21. In further detail, when the transmission destination address of the communication data is not an address of the air-conditioning controller 21, the relay 122 reads and discards the communication data, and does not relay the communication data to the air-conditioning controller 21.

Herein, the relay 122 of the present Embodiment 3 has both a function of relaying a communication command in real time, and a function of storing the data in the memory 26. For this reason, the relay 122 is a microprocessor or other components having a higher specification than that of the relay 22 of Embodiments 1 and 2.

The data-obtaining processor 125 is configured to obtain all the communication data exchanged between the communication devices from the memory 26. That is, the data-obtaining processor 125 obtains the communication data stored by the relay 122 from the memory 26, and executes the abnormality determination by using the obtained communication data similarly as in Embodiments 1 and 2. Other functions of the data-obtaining processor 125 are similar to those of the data-obtaining processor 25 of Embodiments 1 and 2.

Herein, a difference of a method of the abnormality determination of the air-conditioning system 10 by the control unit 210 of the present Embodiment 3 from the methods of Embodiments 1 and 2 will be described with reference to FIG. 4. The control unit 210 obtains all the communication data exchanged between the communication devices by the relay 122 (step S101), and temporarily stores the obtained communication data in the memory 26 (step S102). The processing in steps S103 to S106 is executed by the data-obtaining processor 125 similarly as in the data-obtaining processor 25 of Embodiments 1 and 2.

As described above, also with the air-conditioning system 10 of the present Embodiment 3, all the communication data exchanged between the communication devices can be saved in the memory processor 60. Thus, since it is unnecessary to use the external measurement equipment and the measurement application, the labor taken for performing the operation check or other checks on the air-conditioning system 10 can be reduced, and the rapidness of the investigations on the states of the communication devices can be improved.

In addition, according to the present Embodiment 3, the relay 122 stores all the communication data including communication data that is not relayed to the air-conditioning controller 21 in the memory 26. The data-obtaining processor 125 implements the abnormality determination by using the communication data stored in the memory 26 by the relay 122. Then, after the determination on the abnormality, the data-obtaining processor 125 saves the communication data used for the determination in the memory processor 60. Thus, since the tasks of the data-obtaining processor 125 can be reduced, it is possible to improve adaptability to capacity expansion and speeding-up of the communication between the communication devices. Other advantages and aspects are similar to those of Embodiments 1 and 2.

The relay 122 may also store the non-transmission information in the memory 26 similarly as in the relay 22 of Modified Example 1-1. Then, the relay 122 may also use the non-transmission information at the time of the abnormality determination. In addition, the relay 122 may also obtain the non-transmission information from the memory 26 in response to the data transmission request from the terminal device 70, and return the obtained non-transmission information to the terminal device 70. When the setting is made as described above, the number of techniques of the abnormality determination can be increased, and the accuracy of the abnormality determination can be increased. In addition, the accuracy of the data analysis by the service person or other staffs can be improved.

Modified Example 3-1

According to the present Embodiment 3, the case is exemplified where the relay 122 obtains all the communication data exchanged between the communication devices that constitute the air-conditioning system 10, and stores the obtained communication data in the memory 26, but the configuration is not limited to this. The control unit 210 may also divide operations of data collection processing to be performed by the data-obtaining processor 125 and the relay 122.

That is, according to the present Modified Example 3-1, similarly as in the data-obtaining processor 25 of Embodiments 1 and 2, the data-obtaining processor 125 obtains all the communication data exchanged between the communication devices, and stores the obtained communication data in the memory 26. Then, the relay 122 stores only the non-transmission information in the memory 26. In this manner, when the operations of data collection processing are divided to be performed by the data-obtaining processor 125 and the relay 122, the control unit 210 of the present Modified Example 3-1 can efficiently collect various information.

Embodiment 4

Figure 8:
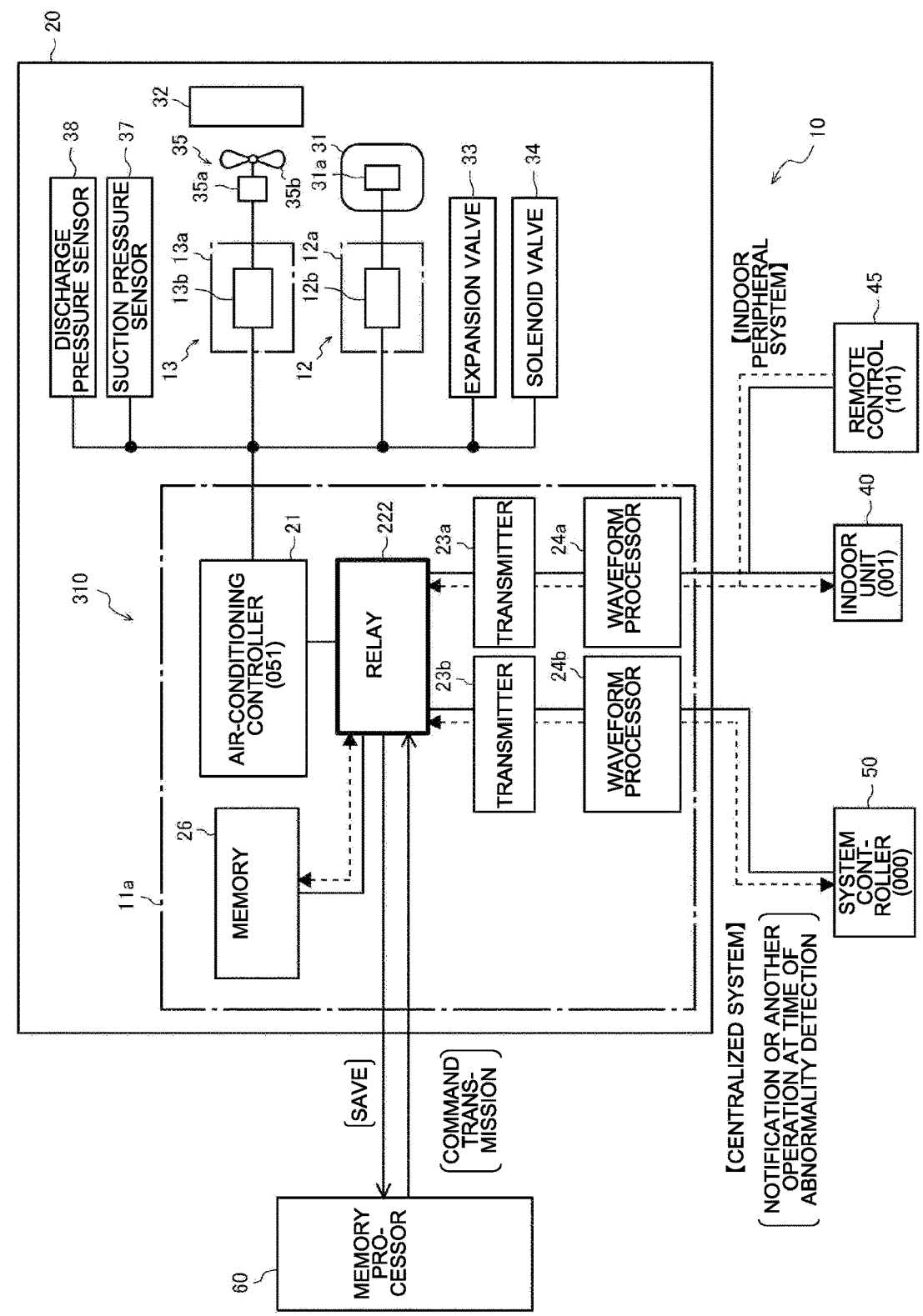
FIG. 8 is a schematic configuration diagram related to acquirement of communication data between communication devices of an air-conditioning system according to Embodiment 4 of the present disclosure.

FIG. 8 is a schematic configuration diagram related to acquirement of the communication data between the communication devices of the air-conditioning system according to Embodiment 4 of the present disclosure. An overall configuration of the air-conditioning management system according to the present Embodiment 4 is similar to that in the example shown in FIG. 1 of Embodiment 1. With regard to a component equivalent to that of Embodiments 1 to 3, a same reference sign is used, and a description thereof is omitted.

A control unit 310 of the present Embodiment 4 has a relay 222 provided with both a function of the relay 122 and a function of the data-obtaining processor 125 according to Embodiment 3. That is, the relay 222 has a function of relaying the communication data from the outside to the air-conditioning controller 21 and also obtaining all the communication data exchanged between the communication devices. In addition, the relay 222 has a function of saving the obtained communication data in the memory processor 60.

Furthermore, the relay 222 has a function of determining whether or not an abnormality occurs in the components of the communication devices by using the obtained communication data, and transmitting abnormality data to the outside when the abnormality occurs. In addition, the relay 222 has a function of obtaining information according to the data transmission request from the terminal device 70 in the outside, and returning the obtained information to the terminal device 70. In other words, the control unit 310 of the present Embodiment 4 executes the processing in steps S103 to S106 of FIG. 4 by the relay 222.

Herein, the relay 222 of the present Embodiment 4 also has a function of saving the obtained communication data in the memory processor 60 in addition to each of the functions that the relay 122 has. For this reason, the relay 222 includes a microprocessor or other components having a still higher specification than that of the relay 122 of Embodiment 3.

As described above, also with the air-conditioning system 10 of the present Embodiment 4, all the communication data exchanged between the communication devices can be saved in the memory processor 60. Thus, since it is unnecessary to use the external measurement equipment and the measurement application, the labor taken for performing the operation check or other checks on the air-conditioning system 10 can be reduced, and the rapidness of the investigations on the states of the communication devices can be improved. In addition, since it is not necessary to dispose the data-obtaining processor 25 or 125 in the control unit 310 of the present Embodiment 4, flexibility for a shape and an arrangement of the main board 11a can be increased, and the control unit 310 can be downsized. Other advantages and aspects are similar to those of Embodiments 1 to 3.

The embodiments described above are preferred specific examples in the control unit, the air-conditioning system, and the air-conditioning management system, and a technical scope of the present disclosure is not limited to these modes. For example, FIG. 1 illustrates a case where the air-conditioning system 10 has the four indoor units 40 and the four remote controls 45, but the configuration is not limited to this. The air-conditioning system 10 may also have one to three or five or more indoor units 40 and one to three or five or more remote controls 45. In addition, FIG. 1 illustrates a case where one remote control 45 is associated with one indoor unit 40, but the configuration is not limited to this. One remote control 45 may also be associated with the indoor units 40. Furthermore, in FIG. 1 or other figures, a case where the air-conditioning system 10 has one outdoor unit 20 is exemplified, but the configuration is not limited to this. The air-conditioning system 10 may also have two or more outdoor units 20. In addition, it is sufficient when a plurality of communication devices including the outdoor unit 20 are interconnected in the air-conditioning system 10, and a configuration may also be adopted where any one or two of the indoor unit 40, the remote control 45, and the system controller 50 are not included.

In addition, according to the embodiments described above, a case is exemplified where the memory processor 60 is disposed outside the outdoor unit 20, but the configuration is not limited to this. The memory processor 60 may also be disposed inside the outdoor unit 20 outside the control unit 11, 110, or 210. Furthermore, a configuration similar to that of the control unit 11, 110, or 210 may also be disposed in the indoor unit 40. That is, for example, the data-obtaining processor 25 and the memory 26 may also be mounted on the main board of the indoor unit 40 or the data storage board disposed in the indoor unit 40.

In addition, the configuration of Embodiment 2 can also be applied to the control unit 210 of Embodiment 3. That is, the control unit 210 may also adopt a configuration where the data-obtaining processor 125 and the memory 26 are not mounted on the main board 11a, and the data-obtaining processor 125 and the memory 26 are mounted on the data storage board that is separately disposed in addition to the main board. A configuration may also be adopted where the air-conditioning management system 100 does not include the terminal device 70.

REFERENCE SIGNS LIST 10 air-conditioning system 11, 110, 210, 310 control unit 11a, 110a main board 12 compressor drive unit 12a inverter board 12b inverter circuit 13 fan drive unit 13a fan board 13b fan drive circuit 20 outdoor unit 21 air-conditioning controller 22, 122, 222 relay 23a, 23b transmitter 24a, 24b waveform processor 25, 125 data-obtaining processor 26 memory 31 compressor 31a compressor motor 32 outdoor heat exchanger 33 expansion valve 34 solenoid valve 35 fan 35a fan motor 35b impeller 37 suction pressure sensor 38 discharge pressure sensor 40 indoor unit 41 indoor control device 42 indoor temperature sensor 45 remote control 50 system controller 60 memory processor 70 terminal device 100 air-conditioning management system 110b data storage board 500 network La indoor-outdoor communication system wiring Lb centralized system wiring

The invention claimed is:

1. An air-conditioning system comprising:
a plurality of communication devices including an outdoor unit that are interconnected,
the outdoor unit having a control unit configured to save all communication data exchanged between the communication devices in a memory processor that can be accessed via a network, wherein
the control unit includes:
an air-conditioning controller configured to control the outdoor unit;
a memory configured to store the communication data;
a relay configured to relay the communication data from an outside to the air-conditioning controller, and obtain and store all the communication data exchanged between the communication devices in the memory; and
a data-obtaining processor configured to obtain all the communication data exchanged between the communication devices from the memory, and save the communication data that is obtained in the memory processor.

2. The air-conditioning system of claim 1, wherein the control unit includes:
a waveform processor configured to apply waveform processing to the communication data relayed by the relay, and
a wiring extending from the data-obtaining processor is connected to a communication line inside the outdoor unit on an outer side than the waveform processor.

3. The air-conditioning system of claim 1, wherein the control unit includes:
a main board on which the air-conditioning controller is mounted; and
a data storage board on which the data-obtaining processor is mounted.

4. The air-conditioning system of claim 1, wherein the data-obtaining processor determines whether or not an abnormality occurs in components of the communication devices by using the communication data that is obtained, and transmits abnormality data to an outside when the abnormality occurs.

5. The air-conditioning system of claim 1, wherein the data-obtaining processor has a function of obtaining information according to a data transmission request from a terminal device in the outside, and returning the information that is obtained to the terminal device.

6. An air conditioning system comprising:
a plurality of communication devices including an outdoor unit that are interconnected,
the outdoor unit having a control unit configured to save all communication data exchanged between the communication devices in a memory processor that can be accessed via a network,
the control unit includes:
an air-conditioning controller configured to control the outdoor unit; and
a relay configured to relay the communication data from an outside to the air-conditioning controller, and obtain all the communication data exchanged between the communication devices, and
the relay saves the communication data that is obtained in the memory processor.

7. The air-conditioning system of claim 6, wherein the relay determines whether or not an abnormality occurs in components of the communication devices by using the communication data that is obtained, and transmits abnormality data when the abnormality occurs.

8. The air-conditioning system of claim 6, wherein the relay has a function of obtaining information according to a data transmission request from a terminal device in the outside, and returning the information that is obtained to the terminal device.

9. An air-conditioning management system comprising:
the air-conditioning system of claim 1; and
the memory processor configured to save all the communication data exchanged between the communication devices.

* * * * *